United States Patent [19]
Hershey et al.

[11] Patent Number: 5,680,143
[45] Date of Patent: Oct. 21, 1997

[54] METHOD AND APPARATUS FOR A LOW COMPLEXITY SATELLITE RANGING SYSTEM USING GAUSSIAN NOISE OVERLAY

[75] Inventors: John Erik Hershey, Ballston Lake; Stephen Michael Hladik, Albany; Gary Jude Saulnier, Rexford; David Allen Langan, Clifton Park, all of N.Y.

[73] Assignee: Lockheed Martin Corporation, King of Prussia, Pa.

[21] Appl. No.: 655,111

[22] Filed: May 29, 1996

[51] Int. Cl.$^6$ ........................................... H01Q 3/22
[52] U.S. Cl. ........................ 342/375; 342/118; 342/458
[58] Field of Search ........................ 342/458, 375, 342/352, 118; 455/50.1

[56] References Cited

U.S. PATENT DOCUMENTS

| | | |
|---|---|---|
| 3,940,731 | 2/1976 | Cooper et al. |
| 4,005,420 | 1/1977 | McDonald. |
| 4,641,304 | 2/1987 | Raychaudhuri ............ 370/95 |
| 4,688,213 | 8/1987 | Raychaudhuri ............ 370/93 |
| 5,128,680 | 7/1992 | Sabato et al. ............ 342/60 |
| 5,291,202 | 3/1994 | McClintock. |

*Primary Examiner*—Theodore M. Blum
*Attorney, Agent, or Firm*—W. H. Meise; G. H. Krauss; S. A. Young

[57] ABSTRACT

A ranging system for a communications spacecraft (14) overlays a Gaussian noise signal over a broadband channel which also carries information or traffic signals. The noise is used to establish the range between a ground station (12) and the spacecraft (14). The range is determined by delaying the Gaussian noise in a controllable delay (32), and autocorrelating the delayed noise with the noise returned over the communications channel from the spacecraft. The ranging system (FIG. 4) reduces the bandwidth of the noise in a filter (18) during initial acquisition, to color the noise and broaden the autocorrelation peak (FIG. 3a). The broad peak shortens the initial search time. Once the peak is initially found, the noise bandwidth is progressively broadened to narrow the autocorrelation peak (FIG. 3c) and to give a more accurate indication of range.

19 Claims, 3 Drawing Sheets

METHOD AND APPARATUS FOR A LOW COMPLEXITY SATELLITE RANGING SYSTEM USING GAUSSIAN NOISE OVERLAY

FIELD OF THE INVENTION

This invention relates to ranging, and more specifically to determination of the range or distance between two different locations, where one of the locations has a signal repeater.

BACKGROUND OF THE INVENTION

Communication systems currently in use often use spacecraft repeaters or transponders as intermediaries to transmit information traffic to locations beyond line-of-sight. One common type of system uses a communication satellite located in a geosynchronous orbit to receive signals over an uplink from a ground station within a first frequency band, such as K-band (above about 11 GHz), and to frequency-convert the signals to a lower frequency, such as C-band (about 4 GHz), for transmission back toward a plurality of ground stations.

A great deal of work has been done on spacecraft-based communication systems. One of the major factors which must be considered in such systems is the very large capital cost of a communication satellite or spacecraft, and the finite bandwidth of each of its transponder channels. The high cost requires that the maximum possible use be made of the available transponder channel bandwidth. One well-known scheme breaks the transmissions from the ground stations into short bursts with predetermined duration, and transmits the bursts at times selected to arrive at the spacecraft within predetermined "slot" intervals. If the transmissions from the ground stations can be synchronized and timed so that one, and only one, transmitted burst of information arrives at the spacecraft transponder during each slot interval, and if that transmitted burst of information as it arrives at the spacecraft does not overlap onto one of the temporally adjacent time slots, the spacecraft channel will be maximally used. The problem of synchronizing the ground stations so as to minimize the number of transmission bursts arriving during each slot interval is solved in a number of ways, one of which is the Aloha-style system, in which a particular scheduling protocol is followed in the event that two or more transmissions interfere in a slot. The scheduling protocol increases the likelihood that succeeding transmissions will not interfere. An ANNOUNCED RETRANSMISSION RANDOM ACCESS SYSTEM is described in U.S. Pat. No. 4,641,304, issued Feb. 2, 1987 in the name of Raychaudhuri, and U.S. Pat. No. 4,688,213, issued Aug. 18, 1987 in the name of Raychaudhuri, describes an ASYNCHRONOUS RANDOM ACCESS COMMUNICATION SYSTEM WITH COLLISION RESOLUTION BASED ON TIME OF ARRIVAL.

The problem of preventing a transmission arriving at the spacecraft repeater from overlapping from its intended slot onto a preceding or following slot is different from the problem of scheduling. When a burst transmission is properly scheduled for a particular time slot, it must arrive at the spacecraft at the beginning of the selected time slot, and cannot overlap onto the preceding or succeeding time slot without destroying the information in both time slots. One common way to help to prevent interference between two temporally adjacent burst transmissions, which are scheduled for two successive slots, is to provide a guard time between the slots. This is an effective technique, but the guard time can itself reduce the utilization of a channel.

There is always a tradeoff between channel utilization and guard time, because channel utilization can often be increased by decreasing the duration of the transmission burst, but the presence of an irreducible guard time associated with each burst transmission itself tends to decrease channel utilization. It may not be possible to completely eliminate guard times, but it is desirable to reduce guard time to a minimum in order to maximize channel utilization.

The duration of the guard time associated with each slot or each burst transmission depends upon the temporal accuracy with which each ground station can place its burst transmission at the spacecraft repeater. If the timing cannot be well controlled, a wide guard time will be necessary to prevent interference between temporally adjacent burst transmissions. By contrast, very precise timing allows minimum guard time, and the channel utilization will tend to be maximized.

In order for each ground station to know when to transmit its burst in order to have it arrive at the spacecraft at the beginning of the proper slot interval, the propagation delay between the ground station and the spacecraft must be known, preferably with great exactitude. Determination of the propagation delay between a ground station and a spacecraft can be accomplished by means of beacon signals which are transmitted from an omnidirectional antenna on the spacecraft. This arrangement undesirably requires that the spacecraft carry both a beacon transmitter and an omnidirectional antenna, and has the disadvantage that the measurement is not necessarily made at the same frequency as the information signal. Another scheme uses a continuous-tone beacon signal at a frequency within the bandwidth of one of the transponder channels of the spacecraft; this has the disadvantage that a portion of the available bandwidth is used only for range determination or ranging. Also, bandwidth is not the only limitation on a spacecraft repeater channel, in that the cumulative amplitude of all the signals traversing the channel is also limited by linearity effects. A continuous-tone ranging signal may have an effective amplitude equivalent to a plurality of information signals, because the information signals typically have times in which the amplitude is low, whereas a continuous signal has no such time. Thus, the presence of a continuous-tone ranging signal may significantly reduce the information-carrying capability of a spacecraft repeater channel. U.S. Pat. No. 5,128,680, issued Jul. 7, 1992 in the name of Sabato et al., describes prior-art schemes which use multiple tones, and also describes a MODULATED RANGE TONE SYSTEM which modulates a first tone onto a second tone for ranging.

SUMMARY OF THE INVENTION

A ranging system for determining the distance to a signal repeater includes a transmit-receive station. The repeater may be a spacecraft repeater, and the transmit-receive station may be a ground station. The station includes a source of Gaussian noise and a transmitter coupled to the source of Gaussian noise, for transmitting the Gaussian noise from the station to the repeater. The repeater retransmits the Gaussian noise as retransmitted repeater signals. A controllable variable delay arrangement includes a control port, an output port, and an input port coupled to the Gaussian noise source for receiving the Gaussian noise therefrom. The variable delay arrangement controllably delays the Gaussian noise which is applied to the input port of the variable delay arrangement, under the control of delay control signals applied to the control port of the variable delay arrangement, to thereby generate delayed Gaussian noise signals at the output port of the variable delay arrangement. A correlator is coupled to the output port of the variable delay arrangement and is also coupled for receiving the retransmitted repeater signals, for correlating the delayed Gaussian noise signals with the retransmitted repeater signal. The resulting correlation signals are representative of the correlation between the delayed Gaussian noise signals and the retransmitted repeater signals. A delay controller is coupled to the correlator and to the control signal port of the variable delay arrangement, for generating the delay control signals in a manner which tends to maximize the correlation represented by the correlation signals. The delay of the delay arrangement is indicative of the round-trip delay between the station and the repeater. An indicator is coupled to one of the delay controller and the variable delay arrangement, for providing signals indicative of the delay. In a particular embodiment of the invention, the transmitter includes an upconverter for converting the Gaussian noise to a predetermined frequency range for transmission to the repeater. The correlator or the station preferably includes a receiver for receiving the retransmitted repeater signals, and also includes a downconverter coupled to the receiver, for downconverting the retransmitted repeater signals. The predetermined frequency to which the Gaussian signals are converted for transmission may be different from the frequency range of the retransmitted repeater signals, and information signals may be superposed over the Gaussian signals. In a preferred embodiment of the invention, the Gaussian noise is white Gaussian noise during at least a part of the ranging operation, and at other times, the system includes noise coloring, which colors the Gaussian noise. The noise coloring may be accomplished by filtering white Gaussian noise, and the filtering may be modifiable during operation of the ranging system.

A method for ranging in accordance with the invention includes the step of generating Gaussian noise at a noise source of a transmit-receive station. Transmitted signals including the Gaussian noise are transmitted from the station toward the repeater. The repeater receives the transmitted signals, and generates retransmitted signals, which may be in a different frequency band from the transmitted signals. The retransmitted signals include the Gaussian noise. At the station, the Gaussian noise from the noise source is delayed by an amount established by delay control signal. At the station, the delayed Gaussian noise is correlated with the Gaussian noise received by way of the retransmitted signals. The resulting correlation signal indicates the degree of correlation. The controllable delay of the Gaussian signals from the noise source is adjusted in response to the correlation signals in a manner which tends to maximize the correlation signals. The noise delay at which maximum correlation occurs represents the round-trip propagation delay between the station and the repeater, including delays inherent in the repeater itself. Information relating to the delay is temporarily stored as an indication of the range. In accordance with another aspect of the invention, the Gaussian noise is colored when the ranging is begun, and is progressively made more white as the range is more exactly known, so that information signals accompanying the Gaussian noise can coexist in the channel with less interference, and so that the exact delay may be more exactly known. The Gaussian noise may be generated by an analog noise source, or by a digital pseudorandom generator which produces time-quantized digital signals, which may be bilevel signals.

DESCRIPTION OF THE INVENTION

Copending patent applications RDMM23783 and RDMM24034 describe a spacecraft ranging system which uses broadband ranging signals which occupy all, or substantially all, of a spacecraft repeater channel, and which are superposed on the information traffic within a channel. The broadband signal has low signal power within the bandwidth of the information signal carriers, and allows the information signals to be recovered with little degradation. These broadband signals are in the form of pseudorandom code segments, which tend to produce distinct spectral spikes within the band, because of the signal's structure and periodicity. Any information signals occupying the channel at a frequency near one of these spikes tends to be degraded more than other information signals. It is undesirable to have the presence of the ranging signal disparately affect some of the information signal carriers in a repeater channel more than others. This effect, in turn, limits the ability to use the repeater channel indiscriminately for any information signals which may be required to traverse the channel, and requires special attention. Synchronization of the broadband signals also requires significant time-bandwidth search.

Figure 1:
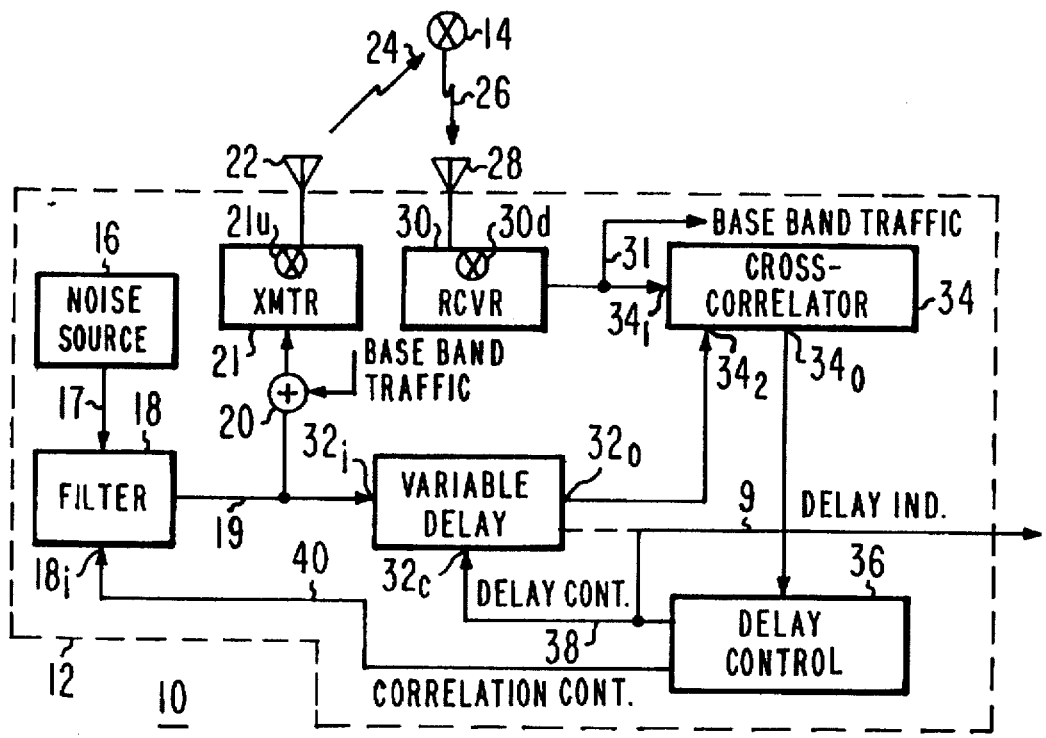
FIG. 1 is a simplified block diagram of a ranging system according to the invention, in which the range between a spacecraft repeater and a ground station is determined.

In FIG. 1, a ranging system 10 includes a ground station 12 and a spacecraft repeater 14. A noise source 16 produces Gaussian noise, which is to say noise whose statistics can be reasonably modeled as Gaussian. Noise generator 16 couples the Gaussian noise over a path 17 to a controllable filter 18, which is described in more detail below. The filtered Gaussian noise signal is applied from filter 18 over a signal path 19 to the input port 32i of a variable delay element illustrated as a block 32, and is also applied to an input port of a summing circuit 20. Summing circuit 20 also receives information signals from a local source (not illustrated), which are added to the filtered noise signal. In a preferred embodiment of the invention, the information signals are baseband signals, and the noise signal is a baseband signal having a bandwidth at least equal to the bandwidth of the spacecraft repeater channel. The summed information signals and Gaussian noise are applied to a transmitter (XMTR) 21, which preferably includes an upconverter 21u for converting the frequency of the baseband signals to a higher frequency. A representative frequency band might be K-band. The K-band signals, including both the information signals and the Gaussian noise, are applied from transmitter 21 to a transmit antenna 22 for transmission over an uplink 24 to spacecraft repeater 14.

Spacecraft repeater 14 of FIG. 1 receives the K-band signals arriving over uplink 24, and processes them in preparation for retransmission over downlink 26. The processing can be expected to include amplification, filtering, and frequency conversion. The downlink frequency is ordinarily lower than the uplink frequency for reasons related to the relatively lower efficiency with which higher-frequency signals can be generated and processed relative to lower-frequency signals. A typical downlink frequency band might be in C-band.

Receive antenna 28 of FIG. 1 receives signals from downlink 26, and couples them to a receiver 30, which includes a downconverter 30d, for converting the received signals from the downlink frequency to an intermediate frequency (IF) or to baseband, if necessary. The downconverted signals are coupled from receiver 30 by a signal path 31 to an information signal utilization device (not illustrated) and to a first input port $34_1$ of cross-correlator 34. However processed, the received signals are applied to first input port $34_1$ of cross-correlator 34. A delayed version of the Gaussian noise from output port $32_o$ of variable delay element 32 is applied to a second input port $34_2$ of cross-correlator 34. The delay of the Gaussian noise applied to input port $34_2$ depends upon the delay control signal applied to the control input port 32c of delay 32. Cross-correlator 34 performs correlations of the received signals applied to its input port $34_1$ with the delayed signals applied to its input port $34_2$, and produces a correlation signal, which represents the present-time (current) degree of correlation between the signals, at its output port $34_o$. The presence of the information signals in the received signals applied to input port $34_1$ tends to reduce the overall correlation, but does not affect the existence of correlation between the noise components. When the delay of variable delay element 32 equals the round-trip propagation time of the signals traversing uplink 24, spacecraft repeater 14, and downlink 26, the correlation between the two noise signals will be at a maximum. Delay controller 36 receives information relating to the degree of correlation from output port $34_o$ of correlator 34, and also knows other information, such as how long it has been since it was turned ON, the instructions (the signal) which it is currently providing to input port 18i of filter 18 by way of signal path 40. The external control signal is the product of R and C. The effect of this filter is to color the white Gaussian noise from source 16.

Figure 2A:
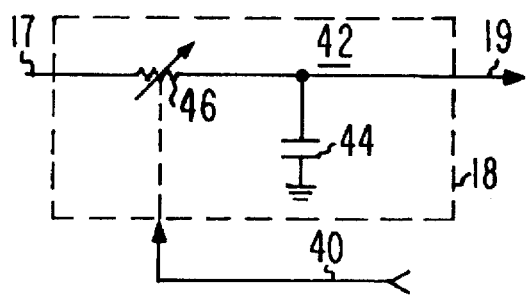
FIG. 2a is a simplified schematic diagram of a filter which may be used in an embodiment of the arrangement of FIG. 1 when the noise source is an analog noise source.

FIG. 2a is a simplified schematic diagram of filter 18 of FIG. 1. In FIG. 2a, filter 18 is a resistive-capacitive low-pass filter 42 including a series variable resistance 46 and a shunt capacitor 44. This form of analog filter is used when Gaussian noise source 16 of FIG. 1 is an analog noise source such as a back-biased diode, or some other equivalent device. Low-pass filter 42 of FIG. 2a has its cut-off frequency adjusted by controlling the resistance of variable resistor 46. The control signals are applied to variable resistor 46 byway of control signal path 40. Variable resistors may be made in various forms, such as motor-driven rheostats or field-effect transistors, as known in the art. The transfer function is given by $$H(\omega) = \frac{1}{1 + j\omega\tau_0}$$

where $\tau_0 = RC$.

Noise source 16 of FIG. 1 produces white Gaussian noise. The use of white Gaussian noise is advantageous, because it can be overlaid on the traffic signals, with minimal degradation of the traffic signals, as described in more detail below.

Figure 2B:
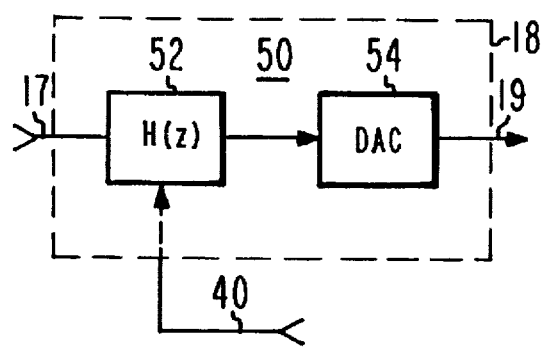
FIG. 2b is a representation of a filter and digital-to-analog converter which may be used as an alternative to the arrangement of FIG. 2a when the noise source of FIG. 1 is digital.

FIG. 2b is a simplified block diagram of another embodiment of filter 18 of FIG. 1, which is used when Gaussian noise source 16 is a digital noise source. In FIG. 2b, the digital noise is applied over signal path 17 to a digital filter block 52, which implements a transfer function H(z), which is variable under control of a digital control signal applied over signal path 40. Transfer function H(z) represents filtering. H(z) is realized by converting the digital input stream of Gaussian noise sample values x(n) into the output digital stream of values y(n) where $Y(n) = (1-\rho) x(n) + \rho x(n-1)$ and $\rho$ is the sample-to-sample correlation of the degree of coloring. A digital-to-analog converter (DAC) 54 converts the filtered digital noise signal from block 52 into analog form, for application to signal path 19.

Figure 3A:
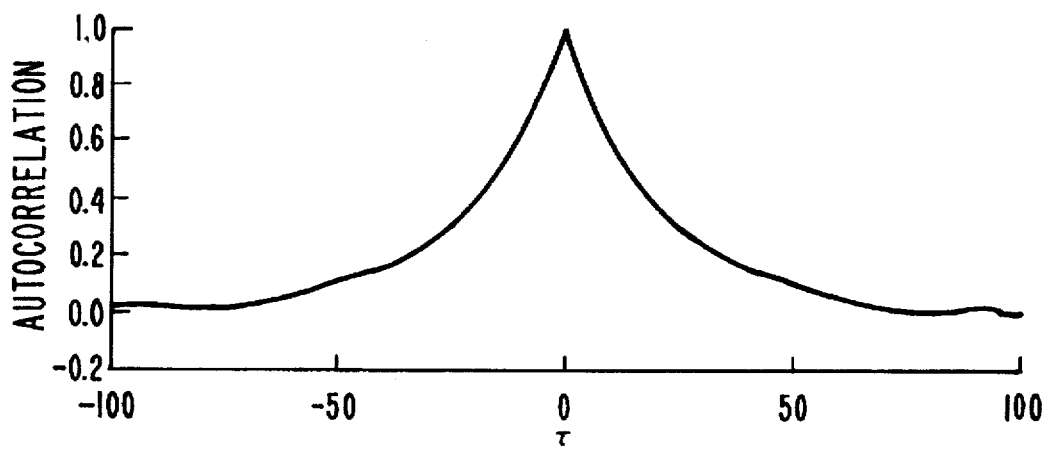
FIGS. 3a and 3b are normalized plots of autocorrelation for Gaussian noise having correlation coefficient $\rho=0.95$ and 0.75, respectively.
Figure 3B:
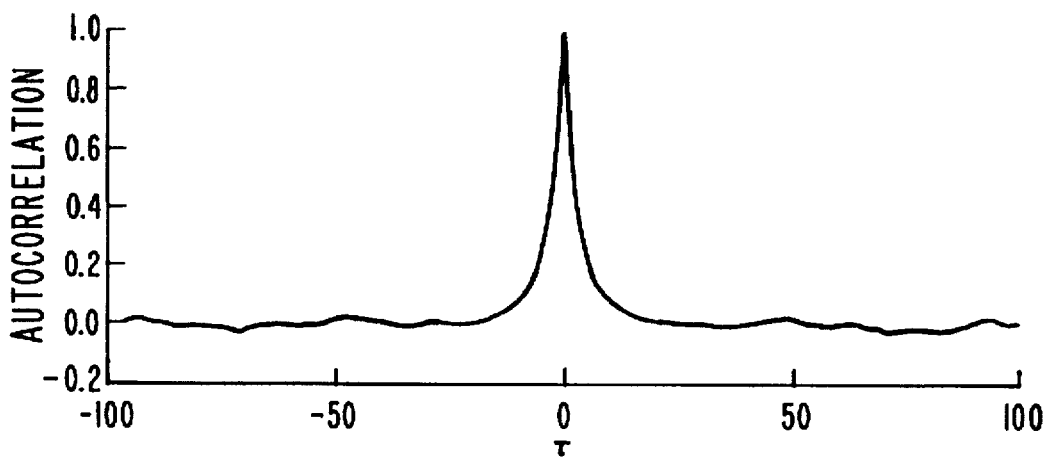
Figure 3C:
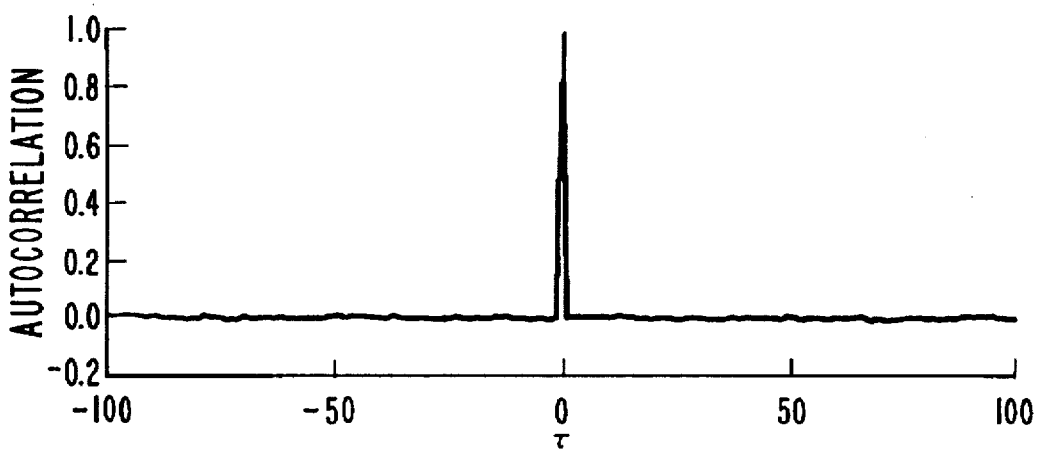
FIG. 3c is a similar normalized plot for white Gaussian noise with correlation coefficient $\rho=0.00$.

FIG. 3a is a plot of autocorrelation versus delay difference $\tau$ for Gaussian noise which is "pink", in that the high-frequency components have been attenuated, so that the correlation coefficient $\rho$ is 0.95. The correlation coefficient discloses, in a known statistical sense, how similar adjacent samples are to each other. It also determines or affects the bandwidth of the signal, in that, the closer $\rho$ is to unity, the narrower the bandwidth of the associated signal, the closer $\rho$ is to zero, the wider the bandwidth, and the flatter the power spectral density. FIG. 3b represents a similar plot of autocorrelation versus $\tau$ for $\rho = 0.75$, and FIG. 3c is a plot of autocorrelation versus $\tau$ for the case of while noise, $\rho = 0.00$. In the arrangement of FIG. 1, the Gaussian noise is applied to the uplink, and it ultimately arrives at first input port $34_1$ of correlator 34 after traversing the uplink and downlink. The same noise signal arrives at second input port $34_2$ of correlator 34 by way of controllable delay 32. Thus, correlator 34 receives the same noise signal at its two input ports, and the correlation which it performs is essentially an autocorrelation (self-correlation). As a result, the plots of FIGS. 3a, 3b, and 3c represent the range of possible normalized outputs from correlator 34 in response to slight timing differences, for two different pink Gaussian noises and one white Gaussian noise. As can be seen, the autocorrelations of pink noise of FIGS. 3a and 3b have broader peaks than the white-noise case of FIG. 3c.

In general, in operation of the arrangement of FIG. 1 with either an analog or a digital noise source, a search is performed for the maximum cross-correlation of the Gaussian noise signal. The search is performed over the range of possible delay values. In many cases, the approximate delay will be known, as would be the case, for example, for a fixed ground station communicating with a geosynchronous satellite. One method for search for the maximum value of cross-correlation is to sequentially compute the cross-correlation of the noise signal with the returned or received signal at each of a set of different time delays, and to select the maximum value of cross-correlation which is calculated. The value of the time delay corresponding to the maximum value of cross-correlation is deemed to be the desired value of time delay. The search time for this sort of search is proportional to the number of time delays in the set of different time delays being considered. In order to ensure that this search strategy is successful, the time delay candidates being searched must be spaced so that the delay differences do not exceed the time width of the cross-correlation "spike."

The search time can be significantly reduced by initially coloring the Gaussian noise. The colored noise has a wider cross-correlation spike than the white noise, as illustrated in FIG. 3a, and thus the time delay candidates which are selected for searching can be spaced farther apart. This reduces the total number of time delay candidates which must be searched, and consequently speeds the search. Once an estimate of the time delay is achieved with the pink noise, the noise source can be progressively "whitened" by adjusting the filter, which reduces the time width of the cross-correlation spike of the noise. A search is then performed over a relatively smaller time period or time region, near the initially determined peak, with a finer-spaced set of time delays, and the time delay at which the maximum value of cross-correlation occurs is again established. This newly determined time delay should be very near the previously determined value, and should be a more accurate determination of the range, because of the smaller time increments of the candidate values. The noise source is again whitened, and the search repeated with finer-spaced time delays, and this whitening and searching is repeated until the time delay is established to within the desired degree of accuracy.

The described technique has the disadvantage that, during the range acquisition process, pink Gaussian noise traverses the communication system together with the information signals or traffic signals. The pink Gaussian noise has a power spectral density which is highly peaked, so some interference with the traffic signals is to be expected during range acquisition. However, after acquisition is completed, the pink noise is converted to white Gaussian noise to maintain range tracking, and the white Gaussian noise has minimal effects on the traffic signals.

Figure 4:
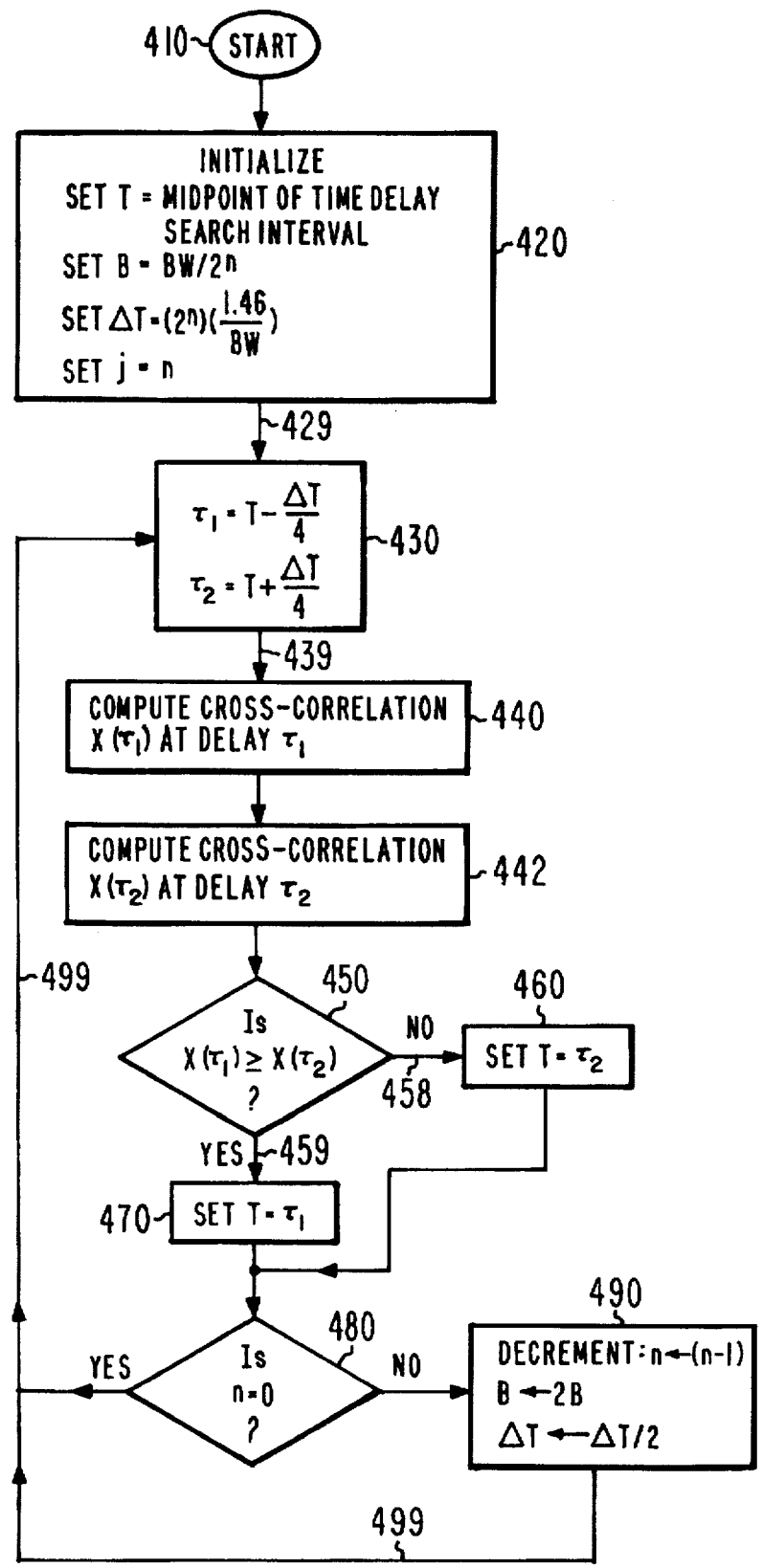
FIG. 4 is a simplified flow chart which illustrates the operation of controller 36 of FIG. 1 in controlling the delay and also in controlling the coloring of the noise.

FIG. 4 is a simplified block diagram of the logic flow of controller 36 of FIG. 1, showing how the system of FIG. 1 is controlled to provide a binary search along the progressively-sharper correlation peak. In FIG. 4, the logic starts at a START block 410, and proceeds to a block 420, which represents initializing the system and the running variables. The Gausssian noise is initialized in block 420 to a highly colored state by reducing its bandwidth (BW) by a factor of $2^n$. The effective bandwidth of the colored Gaussian noise is denoted B, and is thus initialized to $$B = \frac{BW}{2^n}$$

which thereby provides a relatively broad peak of the autocorrelation of the noise. The factor $2^n$ is selected to encompass the region delay time uncertainty, or in other words to encompass the delay value which the algorithm seeks. Also in block 420, a quantity ΔT, which is the width of the delay search time region, is defined as $$\Delta T = (2^n)\left(\frac{1.46}{BW}\right)$$

and a variable T is set to a delay value which represents the midpoint of the region being searched.

From block 420 of FIG. 4, the logic flows by a logic path 429 to a further block 430, in which first and second test delays $\tau_1$ and $\tau_2$ are defined as $$\tau_1 = T - \frac{\Delta T}{4}$$

$$\tau_2 = T + \frac{\Delta T}{4}$$

From block 430, the logic flows over a logic path 439 to a further block 440, which represents calculation of the cross-correlation $X(\tau_1)$ at delay $\tau_1$, and the logic then flows to a further block 442, which represents calculation of the cross-correlation $x(\tau_2)$ at delay $\tau_2$.

After the cross-correlations of the Gaussian noise at test delays $\tau_1$ and $\tau_2$ are computed, the logic of FIG. 4 flows to a decision block 450, in which a test is performed to see if cross-correlation $X(\tau_1)$ is greater than or equal to cross-correlation $X(\tau_2)$. If cross-correlation $X(\tau_1)$ is greater than or equal to cross-correlation $X(\tau_2)$, the logic flow leaves decision block 450 by the YES output, and flows by way of a path 459 to a further block 470, in which running variable T is set equal to $\tau_1$. If cross-correlation $X(\tau_1)$ is less than cross-correlation $X(\tau_2)$, the logic flow leaves decision block 450 by the NO output, and flows by way of a path 458 to a further block 460, in which running variable T is set equal to $\tau_2$. The logic flow reaches decision block decision block 480 from either block 470 or block 480, and the current value of n is compared with zero. So long as n has not reached zero, the bandwidth of the Gaussian noise is still band-limited to less than its maximum possible bandwidth, and the logic leaves decision block 480 by the NO output, and proceeds to a block 490. Block 490 represents a stepwise doubling, or increasing by a factor of two, of the bandwidth B of the filter 18 of FIG. 1. As mentioned above, this doubling of the bandwidth whitens the Gaussian noise, thereby reducing the width, measured in range delay, of the autocorrelation peak. Also in block 490, the current value of n is decremented by one, and running variable ΔT is doubled.

From block 490 of FIG. 1, the logic proceeds by a logic path 499 back to block 430, in which new values of first and second test delays $\tau_1$ and $\tau_2$ are set. These new values of delay are closer to the center value than the values selected during the previous iteration. The logic proceeds around the loop consisting of blocks 430, 440, 442, 450, 460/470, 480, and 490 so long as the value of n has not reached zero, which means so long as the bandwidth of filter 18 of FIG. 1 is less than its maximum value. Eventually, the value of n will be zero when the logic enters decision block 480, and the logic will leave decision block 480 by the YES path, and return directly to block 430 without traversing block 490. The logic will then continue to loop about blocks 430, 440, 442, 450, 460/470, and 480, but not block 490, to establish the value of first and second test delays $\tau_1$ and $\tau T_2$ for which the autocorrelation is maximum. The test delay values for these further iterations are the smallest possible, since the limit of maximizing noise bandwidth and reducing the width of the autocorrelation peak has already been reached. Thus, after the value of n reaches zero, the loop continues to operate, determining the delay value for which the autocorrelation is maximized.

Thus, according to an aspect of the invention, a ranging system (10) for determining the distance to a signal repeater (14) includes a transmit-receive station (12). The repeater (14) may be a spacecraft repeater, and the transmit-receive station (12) may be a ground station. The station (12) includes a source (16, 18) of Gaussian noise and a transmitter (21) coupled to source (16, 18) of Gaussian noise, for transmitting the Gaussian noise from the station (12) to the repeater (14). The repeater (14) retransmits the Gaussian noise in the form of, or as, retransmitted repeater signals. A controllable variable delay arrangement (32) includes a control port (32c), an output port (32o), and an input port (32i) coupled to the Gaussian noise source (16, 18) for receiving the Gaussian noise therefrom. The variable delay arrangement (32) controllably delays the Gaussian noise which is applied to the input port (32i) of the variable delay arrangement (32), under the control of delay control signals applied (over path 38) to the control port (32c) of the variable delay arrangement (32), to thereby generate delayed Gaussian noise signals at the output port (32o) of the variable delay arrangement (32). A correlator (30, 34) is coupled to the output port (32o) of the variable delay arrangement (32) and is also coupled for receiving the retransmitted repeater signals, for correlating the delayed Gaussian noise signals with the retransmitted repeater signal. The resulting correlation signals at the output port (34o) of the correlator (30, 34) are representative of the correlation between the delayed Gaussian noise signals and the retransmitted repeater signals. A delay controller (36) is coupled to the correlator (30, 34) and to the control signal port (32c) of the variable delay arrangement (32), for generating the delay control signals in a manner which tends to maximize the correlation represented by the correlation signals. The delay of the delay arrangement (32) is indicative of the round-trip delay between the station (12) and the repeater (14). A coupler (9) is coupled to one of the delay controller and the variable delay arrangement, for providing signals indicative of the delay. The signals may be used in any manner. In a particular embodiment of the invention, the transmitter (21) includes an upconverter (21u) for converting the Gaussian noise to a predetermined frequency range for transmission to the repeater. The correlator (30, 34) or the station (12) preferably includes a receiver (30) for receiving the retransmitted repeater signals, and also includes a downconverter (30d) coupled to the receiver, for downconverting the retransmitted repeater signals. The predetermined frequency to which the Gaussian signals are converted for transmission may be different from the frequency range of the retransmitted repeater signals, and information signals may be superposed (by adder 20) over the Gaussian signals. In a preferred embodiment of the invention, the Gaussian noise is white Gaussian noise during at least a part of the ranging operation, and at other times, the system includes noise coloring, which colors the Gaussian noise. The noise coloring may be accomplished by filtering white Gaussian noise with filters (such as 18 of FIG. 2a or 2b), and the filtering may be modifiable during operation of the ranging system (by signals applied over signal path 40).

Other embodiments of the invention will be apparent to those skilled in the art. For example, while the uplink has been described as being at C-band and the downlink at K-band, the uplink may be in some other frequency range, such as X-band, and the downlink may also be in some other frequency range, such as C-band or X-band. While filter 18 of FIG. 2a is illustrated as being tuned or adjusted by control of its resistance 46, it may also be controlled, if desired, by control of the capacitor 44.

What is claimed is:

1. A ranging system for determining the electromagnetic signal delay to a signal repeater, said system including a transmit-receive station comprising:

a source of Gaussian noise;

transmitting means coupled to said source of Gaussian noise, for transmitting said Gaussian noise to said repeater, whereby said repeater retransmits said Gaussian noise as retransmitted repeater signals;

variable-delay means including a control port, an output port, and an input port coupled to said source of Gaussian noise for receiving said Gaussian noise therefrom, for controllably delaying said Gaussian noise applied to said input port of said variable-delay means under the control of delay control signals applied to said control port of said variable-delay means, to thereby generate delayed Gaussian noise signals at said output port of said variable-delay means;

correlation means coupled to said output port of said variable-delay means and also coupled for receiving said retransmitted repeater signals, for correlating said delayed Gaussian noise signals with said retransmitted repeater signal, for thereby generating correlation signals representative of the correlation between said delayed Gaussian noise signals and said retransmitted repeater signals;

delay control means coupled to said correlation means and to said control signal port of said variable-delay means, for generating said delay control signals in a manner which tends to maximize said correlation signals; and indication means coupled to one of said delay control means and said variable-delay means, for providing signals indicative of said delay.

2. A ranging system according to claim 1, wherein said transmitting means includes upconverting means for converting said Gaussian noise to a predetermined frequency range for transmission to said repeater.

3. A ranging system according to claim 2, wherein said correlation means includes a receiver for receiving said retransmitted repeater signals, and also includes downconverting means coupled to said receiver for downconverting said retransmitted repeater signals.

4. A ranging system according to claim 3, wherein said predetermined frequency range to which said filtered Gaussian signals are converted for transmission to said repeater is different from the frequency range of said retransmitted repeater signals.

5. A ranging system according to claim 1, wherein said source of Gaussian noise is a source of white Gaussian noise.

6. A ranging system according to claim 5, wherein said system further comprises:

noise coloring means, for coloring said Gaussian noise, to generate colored Gaussian noise signals.

7. A ranging system according to claim 6, wherein said noise coloring means comprises coloring filter means coupled to receive said white noise, for generating said colored Gaussian noise signals.

8. A ranging system according to claim 6, wherein said noise coloring means includes means for adjusting said coloring at particular times during operation of said ranging system.

9. A ranging system according to claim 1, wherein said transmitting means further includes means for transmitting information on carriers lying within said predetermined band.

10. A ranging system according to claim 1, wherein said station is a ground station, and said repeater is a communication satellite.

11. A method for determining the electromagnetic signal delay between a repeater and a transmit-receive station, comprising the steps of:

at said station, generating Gaussian noise;

transmitting signals, including said Gaussian noise, from said station toward said repeater, to thereby generate transmitted signals;

at said repeater, receiving said transmitted signals, and generating retransmitted signals including said Gaussian noise, to thereby form retransmitted signals;

at said station, controllably delaying said Gaussian noise from said source, to thereby generate delayed Gaussian noise;

at said station, correlating said delayed Gaussian noise with said Gaussian noise included in said retransmitted signals, to thereby generate correlation signals representative of the amount of correlation;

controlling said step of controllably delaying in response to said correlation signals in a manner which causes said correlation signals to be maximized; and recording at least the amount of delay which results in said maximization of said correlation signals.

12. A method according to claim 11, wherein said steps of
(a) generating Gaussian noise, (b) transmitting signals, including said Gaussian noise, from said station toward said repeater, (c) at said repeater, receiving said transmitted signals and generating retransmitted signals, (d) controllably delaying said Gaussian noise, (e) correlating said delayed Gaussian noise with said Gaussian noise included in said retransmitted signals, and (f) controlling said step of controllably delaying are repeated, and further including the step of, after each repetition of said steps, adjusting the coloring of said Gaussian noise.

13. A method according to claim 12, wherein said step of adjusting the coloring of said Gaussian noise includes the step of reducing said coloring of said Gaussian noise, whereby said Gaussian noise becomes more white with time, which tends to provide a more exact indication of the delay at which said correlation is maximized.

14. A method according to claim 11, further comprising the steps of:
- at said station, transmitting information signals modulated onto carriers within the same frequency band as that in which said Gaussian noise is carried;
- at said repeater, receiving said transmitted signals including said information signals and said Gaussian noise, and generating said retransmitted signals in a manner including said information signals and said Gaussian noise;
- at said station, coupling said information signals to utilization means.

15. A method according to claim 11, wherein said step of generating Gaussian noise includes the step of generating pseudorandom time-quantized signals.

16. A method according to claim 15, wherein said step of generating pseudorandom time-quantized signals includes the step of generating bilevel signals.

17. A method according to claim 15, wherein said step of generating Gaussian noise includes the step of summing second pseudorandom signals with said pseudorandom time-quantized signals.

18. A method according to claim 11, wherein said step of generating Gaussian noise includes the step of generating multilevel noise signals.

19. A method according to claim 18, wherein said step of generating multilevel noise signals includes the step of generating analog noise signals.

* * * * *